US012671900B2

(12) United States Patent
Kim et al.

(10) Patent No.: US 12,671,900 B2
(45) Date of Patent: Jun. 30, 2026

(54) CAMERA ACTUATOR AND CAMERA DEVICE COMPRISING SAME

(71) Applicant: LG INNOTEK CO., LTD., Seoul (KR)

(72) Inventors: Min Ook Kim, Seoul (KR); Kyung Won Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 90 days.

(21) Appl. No.: 18/580,784

(22) PCT Filed: Aug. 5, 2022

(86) PCT No.: PCT/KR2022/011681
§ 371 (c)(1),
(2) Date: Jan. 19, 2024

(87) PCT Pub. No.: WO2023/014179
PCT Pub. Date: Feb. 9, 2023

(65) Prior Publication Data
US 2024/0380974 A1 Nov. 14, 2024

(30) Foreign Application Priority Data
Aug. 6, 2021 (KR) ........................ 10-2021-0103534

(51) Int. Cl.
*H04N 23/68* (2023.01)
*G03B 17/12* (2021.01)
(Continued)

(52) U.S. Cl.
CPC ......... *H04N 23/6812* (2023.01); *G03B 17/12* (2013.01); *H04N 23/51* (2023.01);
(Continued)

(58) Field of Classification Search
None
See application file for complete search history.

(56) References Cited

U.S. PATENT DOCUMENTS

2015/0261067 A1* 9/2015 Jung .................... H04N 23/687
348/208.1
2018/0364450 A1* 12/2018 Lee ......................... H04N 23/55
(Continued)

FOREIGN PATENT DOCUMENTS

JP 2016-224262 12/2016
KR 10-2018-0137277 12/2018
(Continued)

OTHER PUBLICATIONS

International Search Report dated Nov. 16, 2022 issued in Application No. PCT/KR2022/011681.

*Primary Examiner* — Quan Pham
(74) *Attorney, Agent, or Firm* — KED & ASSOCIATES

(57) ABSTRACT

One embodiment of the present invention discloses a camera actuator comprising: a housing; a mover disposed in the housing and comprising an optical member and a holder having the optical member disposed therein; a tilting guide unit for guiding the tilting of the mover; a first magnet disposed in the housing; a second magnet disposed in the holder and spaced from the first magnet in a first direction; and a first driving part and a second driving part for driving the mover, wherein the first driving part and the second magnet are disposed, with respect to the holder, in a second direction perpendicular to the first direction, and the second driving part is disposed, with respect to the holder, in a third direction perpendicular to the second direction.

18 Claims, 20 Drawing Sheets

(51) Int. Cl.
    H04N 23/51       (2023.01)
    H04N 23/57       (2023.01)

(52) U.S. Cl.
    CPC ..... H04N 23/57 (2023.01); *G03B 2205/0023*
            (2013.01); *G03B 2205/0069* (2013.01)

(56)                References Cited

U.S. PATENT DOCUMENTS

2020/0363626 A1*  11/2020  Seo ........................ G03B 30/00
2022/0252895 A1*   8/2022  Kwon ..................... G03B 3/10

FOREIGN PATENT DOCUMENTS

KR        10-2131597      8/2020
KR     10-2021-0078103     6/2021
KR     10-2021-0078104     6/2021
WO    WO-2021107524 A1 *  6/2021  ........... H04N 23/687

* cited by examiner

CAMERA ACTUATOR AND CAMERA DEVICE COMPRISING SAME

CROSS-REFERENCE TO RELATED PATENT APPLICATIONS

This application is a U.S. National Stage Application under 35 U.S.C. § 371 of PCT Application No. PCT/KR2022/011681, filed Aug. 5, 2022, which claims priority to Korean Patent Application No. 10-2021-0103534, filed Aug. 6, 2021, whose entire disclosures are hereby incorporated by reference.

TECHNICAL FIELD

The present invention relates to a camera actuator and a camera device including the same.

BACKGROUND ART

A camera is a device for taking pictures or videos by capturing images of subjects and is mounted on mobile devices, drones, vehicles, or the like. In order to improve the quality of the image, a camera device may have an image stabilization (IS) function for correcting or preventing the image shake caused by the movement of a user, an auto focusing (AF) function for aligning a focal length of a lens by automatically adjusting an interval between an image sensor and the lens, and a zooming function for capturing an image of a remote subject by increasing or decreasing the magnification of the remote subject through a zoom lens.

Meanwhile, a pixel density of the image sensor increases as a resolution of the camera increases, and thus a size of the pixel becomes smaller, and as the pixel becomes smaller, the amount of light received for the same time decreases. Therefore, as the camera has a higher pixel density, the image shake caused by hand shaking due to a shutter speed decreased in a dark environment may more severely occur. As a representative IS technique, there is an optical image stabilizer (OIS) technique of correcting motion by changing a path of light.

According to the general OIS technique, the motion of the camera may be detected through a gyro sensor or the like, and a lens may tilt or move, or a camera module including a lens and an image sensor may tilt or move based on the detected motion. When the lens or the camera module including the lens and the image sensor tilts or moves for an OIS, it is necessary to additionally secure a space for tilting or moving around the lens or the camera module.

Meanwhile, an actuator for an OIS may be disposed around the lens. In this case, the actuator for an OIS may include actuators, which are in charge of tilting of two axes perpendicular to an optical axis Z, that is, an actuator in charge of an X-axis tilting and an actuator in charge of a Y-axis tiling.

However, according to the needs of ultra-slim and ultra-small camera modules, there is a large space constraint for arranging the actuator for an OIS, and it may be difficult to secure a sufficient space for an OIS where the lens or the camera module including the lens and the image sensor itself may be tilted or moved. In addition, as the camera has a higher pixel density, it is preferable that a size of the lens be increased to increase the amount of received light, and there may be a limit to increasing the size of the lens due to a space occupied by the actuator for an OIS.

In addition, when the zooming function, the AF function, and the OIS function are all included in the camera device, there is a problem that an OIS magnet and an AF or zoom magnet are disposed close to each other to cause magnetic field interference.

DISCLOSURE

Technical Problem

The present invention is directed to providing a camera actuator applicable to ultra-slim, ultra-small, and high-resolution cameras.

Technical Solution

One aspect of the present invention provides a camera actuator including a housing, a mover disposed in the housing and including an optical member and a holder in which the optical member is disposed, a tilting guide part configured to guide tilting of the mover, a first magnet disposed in the housing, a second magnet disposed in the holder and spaced apart from the first magnet in a first direction, and a first driving part and a second driving part configured to drive the mover, wherein the first driving part and the second magnet are disposed in a second direction perpendicular to the first direction with respect to the holder, and the second driving part is disposed in a third direction perpendicular to the second direction with respect to the holder.

The second magnet and the first driving part may be spaced apart from each other in the first direction, and the second magnet and the second driving part may be spaced apart from each other in the second direction perpendicular to the first direction.

The second magnet and the second driving part may not overlap each other in the first direction, the second direction, and a third direction perpendicular to the second direction.

The tilting guide part may be disposed in the first direction with respect to the holder.

The tilting guide part may include an area overlapping at least a portion of the second magnet in the first direction.

The first magnet may be disposed between the second magnet and the first driving part.

Facing surfaces of the first magnet and the second magnet may have the same polarity.

The camera actuator may further include a third driving part disposed opposite to the first driving part with respect to the holder.

The first magnet may include a 2a magnet of which at least a portion overlaps the first driving part in the first direction, and a 2b magnet of which at least a portion overlaps the third driving part in the first direction.

The first magnet may be disposed between a 1a magnet, which is disposed between the 2a magnet and the first driving part, and a 1b magnet, which is disposed between the 2b magnet and the third driving part.

The tilting guide part may include a plurality of first protruding portions disposed on a surface facing the holder, and the plurality of first protruding portions may be spaced apart from each other in the third direction.

The tilting guide part may include a plurality of second protruding portions disposed on a surface facing the housing, and the plurality of second protruding portions may be spaced apart from each other in the second direction.

The holder may include a first groove in a surface facing the tilting guide part, and the first protruding portion may be disposed in the first groove.

The surface of the holder facing the tilting guide part may be perpendicular to a surface on which the first driving part and the second driving part are disposed.

The housing may include a second groove in a surface facing the tilting guide part, and the second protruding portion may be disposed in the second groove.

A first virtual line passing through centers of widths of the plurality of first protruding portions may be perpendicular to a second virtual line passing through centers of widths of the plurality of second protruding portions.

The first virtual line may cross a third virtual line extending in the first direction to pass through a center of a width of the first driving part.

The second virtual line may cross a fourth virtual line extending in the first direction to pass through a center of a width of the second driving part.

The holder may include a first member disposed between the driving part and the tilting guide part, and the first member may include an accommodating part in which the second magnet is disposed.

The first member may include a groove portion disposed on one surface facing the second magnet and a bonding member disposed in the groove portion to fix the second magnet.

Advantageous Effects

According to the embodiments of the present invention, it is possible to provide a camera actuator applicable to ultra-slim, ultra-small, and high-resolution cameras. In particular, it is possible to effectively arrange an actuator for an OIS even without increasing the overall size of the camera device.

According to the embodiments of the present invention, it is possible to implement a precise OIS function by implementing an X-axis tilting and a Y-axis tilting with a stable structure without causing magnetic field interference between the X-axis tilting and the Y-axis tilting and not causing magnetic field interference with an AF actuator or a zooming actuator.

According to the embodiments of the present invention, it is possible to sufficiently secure the amount of light by resolving a size limit of a lens and implement an OIS with low power consumption.

MODES OF THE INVENTION

Figure 1:
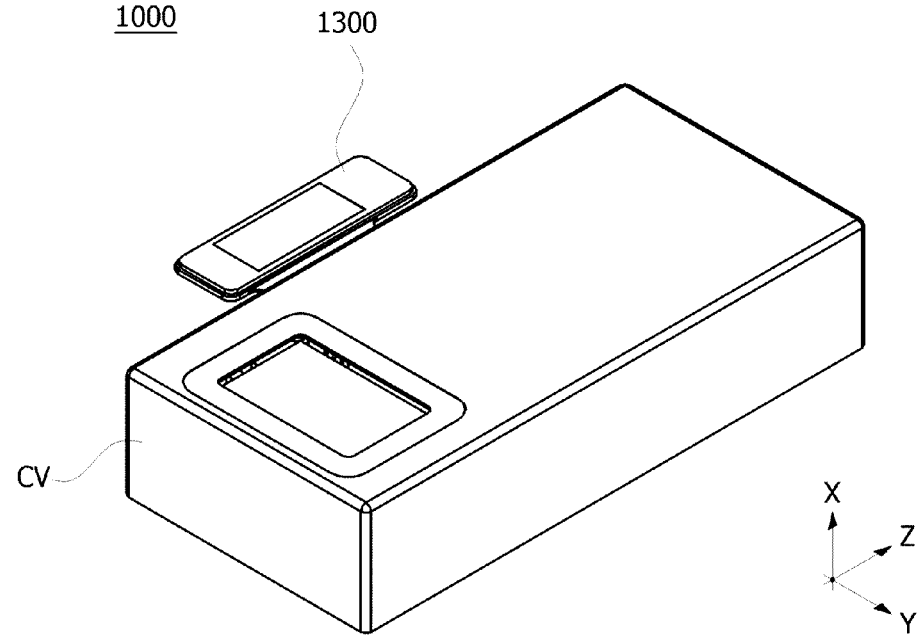
FIG. 1 is a perspective view illustrating a camera module according to an embodiment.

Since the present invention may have various changes and various embodiments, specific embodiments are illustrated and described in the accompanying drawings.

However, it should be understood that this is not intended to limit the present invention to specific embodiments and includes all modifications, equivalents, and substitutes included in the spirit and technical scope of the present invention.

Terms including ordinal numbers such as second or first may be used to describe various components, but the components are not limited by the terms. The terms are used only for the purpose of distinguishing one component from another. For example, a second component may be referred to as a first component, and similarly, the first component may also be referred to as the second component without departing from the scope of the present invention. The term "and/or" includes a combination of a plurality of related listed items or any of the plurality of related listed items.

When a first component is described as being "connected" or "coupled" to a second component, it should be understood that the first component may be directly connected or coupled to the second component or a third component may be present therebetween. On the other hand, when the first component is described as being "directly connected" or "directly coupled" to the second component, it should be understood that the third component is not present therebetween.

The terms used in the application are only used to describe specific embodiments and are not intended to limit the present invention. The singular expression includes the plural expression unless the context clearly dictates otherwise. In the application, it should be understood that terms "comprise" and "have" are intended to specify that a feature, a number, a step, an operation, a component, a part, or a combination thereof described in the specification is present, but do not preclude the possibility of the presence or addition of one or more other features, numbers, steps, operations, components, parts, or combinations thereof.

Unless defined otherwise, all terms used herein, including technical or scientific terms, have the same meaning as commonly understood by those of ordinary skill in the art to which the present invention pertains. Terms such as those defined in a commonly used dictionary should be construed as having a meaning consistent with the meaning in the context of the related art and should not be construed in an ideal or excessively formal meaning unless explicitly defined in the application.

Hereinafter, embodiments will be described in detail with reference to the accompanying drawings, and the same or corresponding components are denoted by the same reference numeral regardless of the reference numerals, and overlapping descriptions thereof will be omitted.

Figure 2:
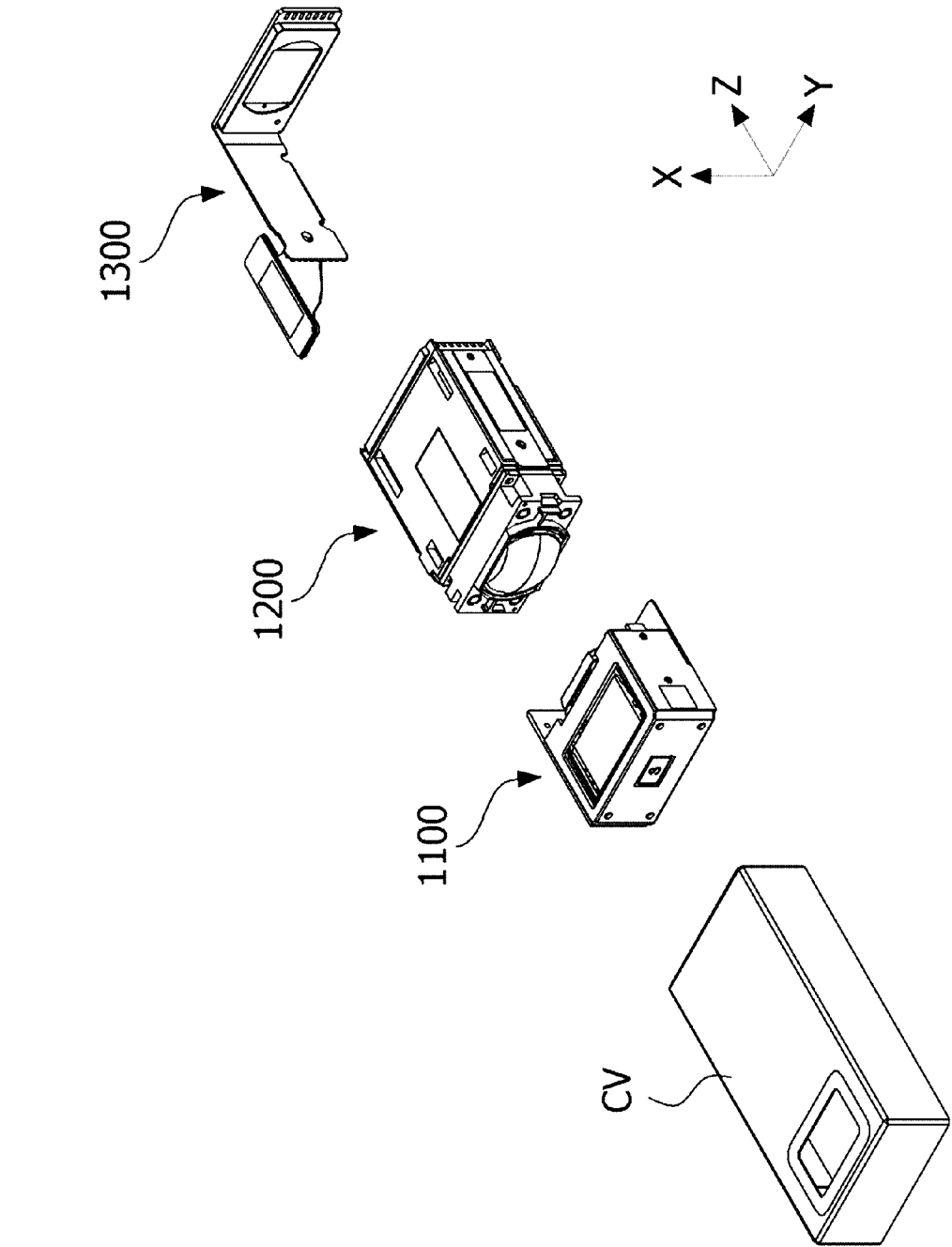
FIG. 2 is an exploded perspective view illustrating the camera module according to the embodiment.
Figure 3:
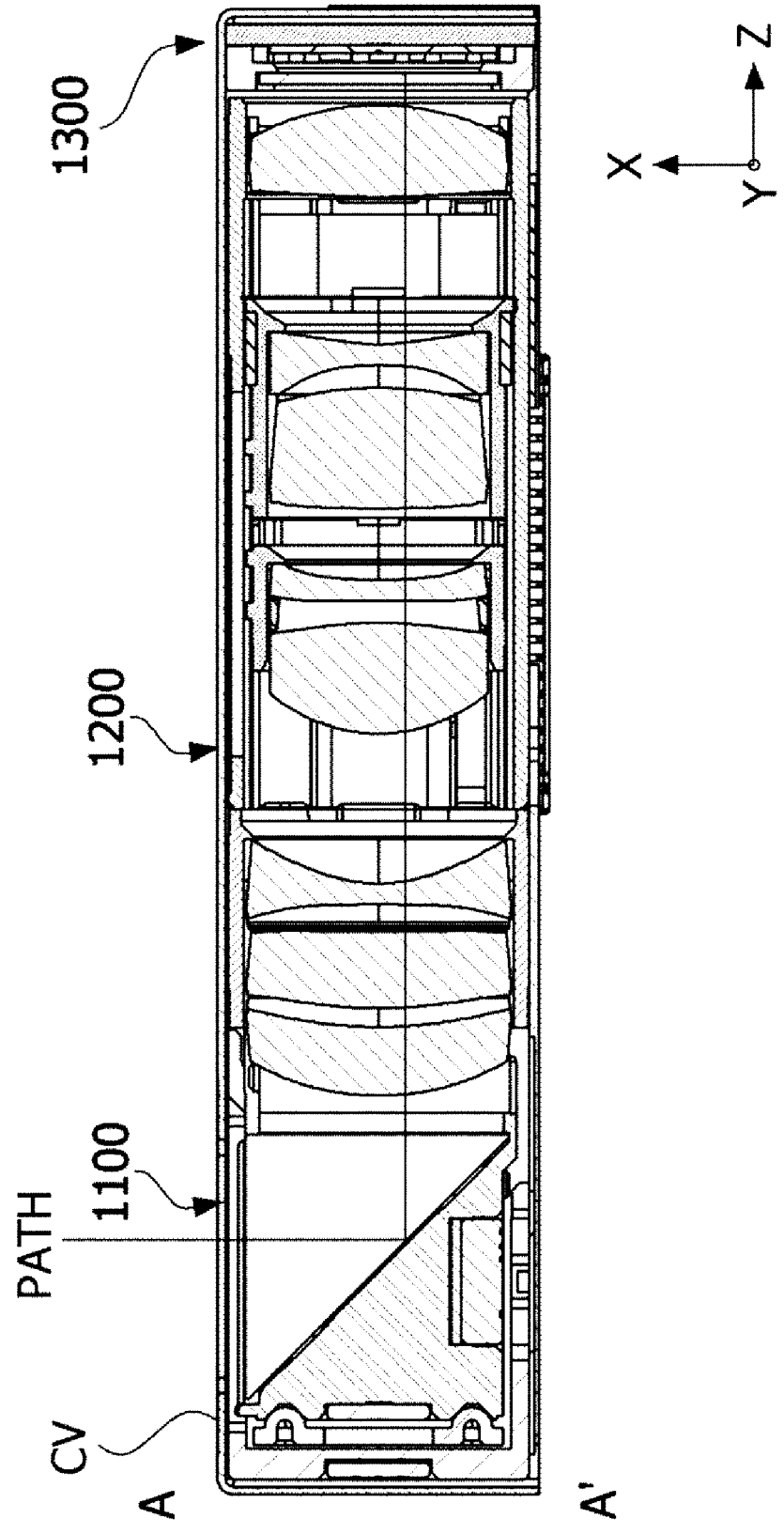
FIG. 3 is a cross-sectional view along line A-A' in FIG. 1.

FIG. 1 is a perspective view illustrating a camera module according to an embodiment, FIG. 2 is an exploded perspective view illustrating the camera module according to the embodiment, and FIG. 3 is a cross-sectional view along line A-A' in FIG. 1.

Referring to FIGS. 1 and 2, a camera module 1000 according to the embodiment may include a cover CV, a first camera actuator 1100, a second camera actuator 1200, and a circuit board 1300. Here, the first camera actuator 1100 may be used interchangeably with "first actuator," and the second camera actuator 1200 may be used interchangeably with "second actuator."

The cover CV may cover the first camera actuator 1100 and the second camera actuator 1200. It is possible to increase a coupling strength between the first camera actuator 1100 and the second camera actuator 1200 by the cover CV.

Furthermore, the cover CV may be made of a material that blocks electromagnetic waves. Therefore, it is possible to easily protect the first camera actuator 1100 and the second camera actuator 1200 in the cover CV.

In addition, the first camera actuator 1100 may be an optical image stabilizer (OIS) actuator.

The first camera actuator 1100 may include a fixed focal length lens disposed in a predetermined barrel (not illustrated). The fixed focal length lens may be referred to as "single focal length lens" or "single lens."

The first camera actuator 1100 may change an optical path. In an embodiment, the first camera actuator 1100 may vertically change the optical path through an internal optical member (e.g., a mirror). With this configuration, even when a thickness of a mobile terminal decreases, a configuration of a lens that is larger than the thickness of the mobile terminal is disposed in the mobile terminal so that zooming, auto focusing (AF), and OIS functions may be performed through the change in the optical path.

The second camera actuator 1200 may be disposed at a rear end of the first camera actuator 1100. The second camera actuator 1200 may be coupled to the first camera actuator 1100. In addition, the mutual coupling may be performed in any of various methods.

In addition, the second camera actuator 1200 may be a zoom actuator or an AF actuator. For example, the second camera actuator 1200 may support one lens or a plurality of lenses and perform an AF function or a zooming function by moving the lenses according to a predetermined control signal of a control unit.

The circuit board 1300 may be disposed at a rear end of the second camera actuator 1200. The circuit board 1300 may be electrically connected to the second camera actuator 1200 and the first camera actuator 1100. In addition, a plurality of circuit boards 1300 may be provided.

A camera module according to the embodiment may be formed of one camera module or a plurality of camera modules. For example, the plurality of camera modules may include a first camera module and a second camera module.

In addition, the first camera module may include one actuator or a plurality of actuators. For example, the first camera module may include the first camera actuator 1100 and the second camera actuator 1200.

In addition, the second camera module may include an actuator (not illustrated) disposed in a predetermined housing (not illustrated) and capable of driving a lens unit. Although the actuator may be a voice coil motor, a micro actuator, a silicone actuator, or the like and applied in various methods such as an electrostatic method, a thermal method, a bimorph method, and an electrostatic force method, the present invention is not limited thereto. In addition, in the specification, the camera actuator may be referred to as "actuator" or the like. In addition, the camera module formed of the plurality of camera modules may be mounted in various electronic devices such as a mobile terminal.

Referring to FIG. 3, the camera module according to the embodiment may include the first camera actuator 1100 for performing the OIS function and the second camera actuator 1200 for performing the zooming function and the AF function.

Light may enter the camera module through an opening region positioned in an upper surface of the first camera actuator 1100. In other words, the light may enter the first camera actuator 1100 in an optical axis direction (e.g., an X-axis direction), and the optical path may be changed in a vertical direction (e.g., a Z-axis direction) through the optical member. In addition, the light may pass through the second camera actuator 1200 and enter an image sensor IS positioned at one end of the second camera actuator 1200 (PATH).

In the specification, a lower surface refers to one side in a first direction. In addition, the first direction is the Z-axis direction in the drawings and may be used interchangeably with a second axis direction or the like. A second direction is a Y-axis direction in the drawings and may be used interchangeably with a first axis direction or the like. The second direction is a direction perpendicular to the first direction. In addition, a third direction is the X-axis direction in the drawings and may be used interchangeably with a third axis direction or the like. The third direction is perpendicular to both the first direction and the second direction. Here, the first direction (Z-axis direction) corresponds to the optical axis direction, and the second direction (Y-axis direction) and the third direction (Z-axis direction) are directions perpendicular to an optical axis and may be tilted by the second camera actuator. Detailed description thereof will be made below.

In addition, hereinafter, the optical axis direction is the first direction (Z-axis direction) in the description of the second camera actuator 1200 will be described below based on this.

In addition, with this configuration, the camera module according to the embodiment may resolve the spatial limits of the first camera actuator and the second camera actuator by changing the optical path. In other words, the camera module according to the embodiment may extend the optical path in response to the change in the optical path while minimizing the thickness of the camera module. Furthermore, it should be understood that the second camera actuator may provide a high range of magnification by controlling a focus or the like in the extended optical path.

In addition, the camera module according to the embodiment may implement an OIS by controlling the optical path through the first camera actuator, thereby minimizing the occurrence of a decentering or tilting phenomenon and providing the best optical characteristics.

Furthermore, the second camera actuator 1200 may include an optical system and a lens driving part. For example, at least one of a first lens assembly, a second lens assembly, a third lens assembly, and a guide pin may be disposed in the second camera actuator 1200.

In addition, the second camera actuator 1200 may include a coil and a magnet to perform a high-magnification zooming function.

For example, although the first lens assembly and the second lens assembly may be moving lenses that move through the coil, the magnet, and the guide pin, and the third lens assembly may be a fixed lens, the present invention is not limited thereto. For example, the third lens assembly may perform a function of a focator by which light forms an image at a specific position, and the first lens assembly may perform a function of a variator for re-forming an image formed by the third lens assembly, which is the focator, at another position. Meanwhile, the first lens assembly may be in a state in which a magnification change is large because a distance to a subject or an image distance is greatly changed, and the first lens assembly, which is the variator, may play an important role in a focal length or magnification change of the optical system. Meanwhile, imaging points of an image formed by the first lens assembly, which is the variator, may be slightly different depending on a position. Therefore, the second lens assembly may perform a position compensation function for the image formed by the variator. For example, the second lens assembly may perform a function of a compensator for accurately forming an image at an actual position of the image sensor using the imaging points of the image formed by the first lens assembly which is the variator. For example, the first lens assembly and the second lens assembly may be driven by an electromagnetic force generated by the interaction between the coil and the magnet. The above description may be applied to a lens assembly to be described below.

Meanwhile, when the OIS actuator and the AF or zoom actuator are disposed according to the embodiment of the present invention, it is possible to prevent the magnetic field interference with an AF or zoom magnet when an OIS is driven. Since a first driving magnet of the first camera actuator 1100 is disposed separately from the second camera actuator 1200, it is possible to prevent the magnetic field interference between the first camera actuator 1100 and the second camera actuator 1200. In the specification, an OIS may be used interchangeably with terms such as hand shaking correction, optical image stabilization, optical image correction, or shaking correction.

Figure 4:
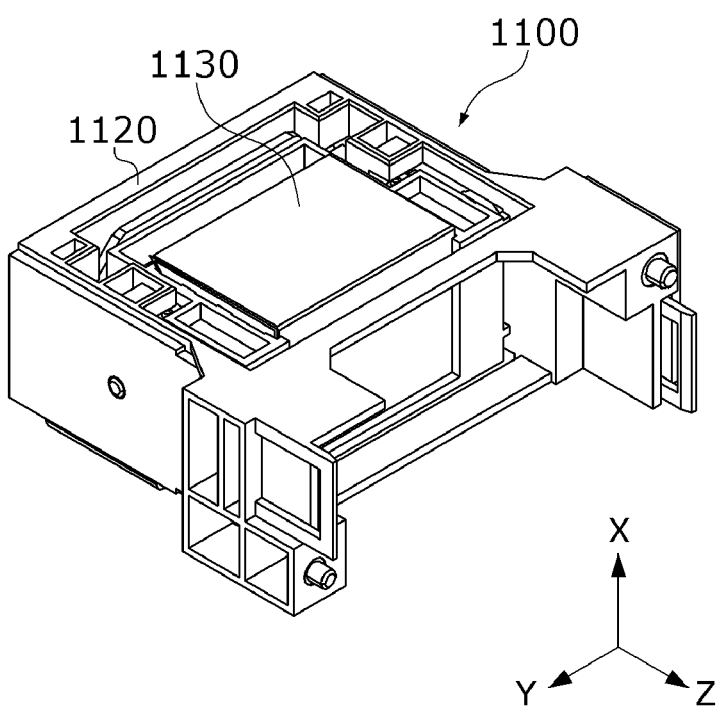
FIG. 4 is a perspective view of a first camera actuator according to the embodiment.
Figure 5:
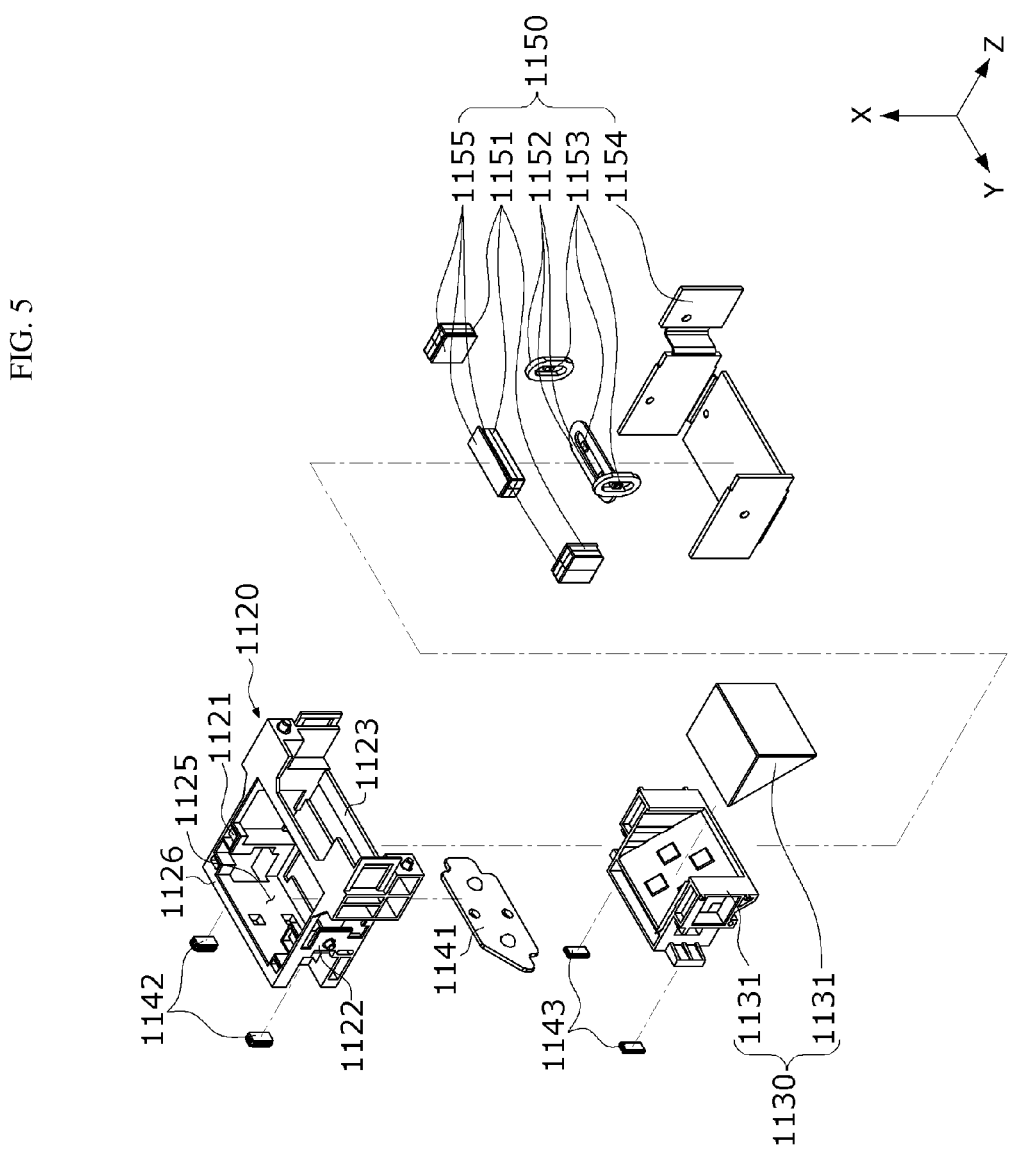
FIG. 5 is an exploded perspective view of the first camera actuator according to the embodiment.

FIG. 4 is an exploded perspective view of the first camera actuator according to the embodiment, and FIG. 5 is an exploded perspective view of the first camera actuator according to the embodiment.

Referring to FIGS. 4 and 5, the first camera actuator 1100 according to the embodiment includes a first shield can (not illustrated), a first housing 1120, a mover 1130, a rotating unit 1140, and a driving part 1150.

The first camera actuator 1100 according to the embodiment includes the housing 1120, the mover 1130, the rotating unit 1140, and the driving part 1150.

The mover 1130 may include a holder 1131 and an optical member 1132 seated on the holder 1131.

In addition, the rotating unit 1140 may include a tilting guide part 1141 and a first magnet 1142 and a second magnet 1143 having different polarities to press the tilting guide part 1141.

In addition, the driving part 1150 includes a drive magnet 1151, a drive coil 1152, a Hall sensor part 1153, a board part 1154, and a yoke part 1155.

First, the first camera actuator 1100 may include the shield can (not illustrated). The shield can (not illustrated) may be positioned at an outermost side of the first camera actuator 1100 and positioned to surround the rotating unit 1140 and the driving part 1150, which will be described below.

The shield can (not illustrated) can block or reduce electromagnetic waves generated from the outside. In other words, the shield can (not illustrated) can reduce the occurrence of malfunction in the rotating unit 1140 or the driving part 1150.

The housing 1120 may be positioned inside the shield can (not illustrated). When there is no shield can, the housing 1120 may be positioned at the outermost side of the first camera actuator.

In addition, the housing 1120 may be positioned inside the board part 1154 to be described below. The housing 1120 may be fastened by being fitted into or engaged with the shield can (not illustrated).

The housing 1120 may include a first housing side portion 1121, a second housing side portion 1122, a third housing side portion 1123, a fourth housing side portion 1124, and a fifth housing side portion 1126. Detailed description thereof will be made below.

The mover 1130 may include the holder 1131 and the optical member 1132 seated on the holder 1131.

The holder 1131 may be seated in an accommodating part 1125 of the housing 1120. The holder 1131 may include a first holder outer surface to a fourth holder outer surface respectively corresponding to the first housing side portion 1121, the second housing side portion 1122, the third housing side portion 1123, and the fifth housing side portion 1126. For example, each of the first holder outer surface to the fourth holder outer surface may correspond to or face one of inner surfaces of the first housing side portion 1121, the second housing side portion 1122, the third housing side portion 1123, and the fifth housing side portion 1126.

The optical member 1132 may be seated on the holder 1131. To this end, the holder 1131 may have a seating surface, a bottom surface, or a surface in an accommodating groove, and the seating surface may be formed by the accommodating groove. In an embodiment, the optical member 1132 may be formed of a mirror or a prism. Hereinafter, the optical member 1132 is illustrated as being the prism, but may be formed of a plurality of lenses as in the above-described embodiment. Alternatively, the optical member 1132 may be formed of the plurality of lenses and the prism or the mirror. In addition, the optical member 1132 may include a reflector disposed therein. However, the present invention is not limited thereto.

In addition, the optical member 1132 may reflect light reflected from the outside (e.g., an object) into the camera module. In other words, the optical member 1132 can resolve spatial limits of the first camera actuator and the second camera actuator by changing the path of the reflected light. Therefore, it should be understood that the camera module may provide a high range of magnification by extending the optical path while minimizing a thickness thereof.

The rotating unit 1140 includes the tilting guide part 1141, and the first magnet 1142 and the second magnet 1143 having different polarities to press the tilting guide part 1141.

The tilting guide part 1141 may be coupled to the mover 1130 and the housing 1120. Specifically, the tilting guide part 1141 may be disposed between the holder 1131 and the fifth housing side portion 1126. Therefore, the tilting guide part 1141 may be coupled to the mover 1130 of the holder 1131 and the housing 1120. However, unlike the above description, in the embodiment, the tilting guide part 1141 may be disposed between the fifth housing side portion 1126 and the holder 1131.

In addition, the tilting guide part 1141 may be disposed adjacent to the optical axis. Therefore, the actuator according to the embodiment may easily change the optical path according to first-axis titling and second-axis tilting to be described below.

The tilting guide part 1141 may include first protruding portions disposed to be spaced apart from each other in the third direction (X-axis direction) and second protruding portions disposed to be spaced apart from each other in the second direction (Y-axis direction). In addition, the first protruding portion and the second protruding portion may protrude in opposite directions. Detailed description thereof will be made below.

A second pole surface of the second magnet 1143 and a first pole surface of the first magnet 1142 facing the second pole surface may have the same polarity. In other words, the first magnet 1142 and the second magnet 1143 may generate a repulsive force and to this end, may have various materials, functions, and the like.

For example, the first magnet 1142 and the second magnet 1143 may generate the repulsive force therebetween due to the above-described polarities. With this configuration, the above-described repulsive force may be applied to the holder 1131 coupled to the first magnet 1142 and the housing 1120 coupled to the second magnet 1143. Therefore, a position of the holder 1131 in the first direction (Z-axis direction) disposed in an accommodating space 1125 of the housing 1120 may be aligned by the repulsive force of the first magnet 1142 and the second magnet 1143. In addition, the position of the holder 1131 in the first direction (Z-axis direction) may be maintained.

The driving part 1150 includes the drive magnet 1151, the drive coil 1152, the Hall sensor part 1153, the board part 1154, and the yoke part 1155. Description thereof will be made below.

Figure 6:
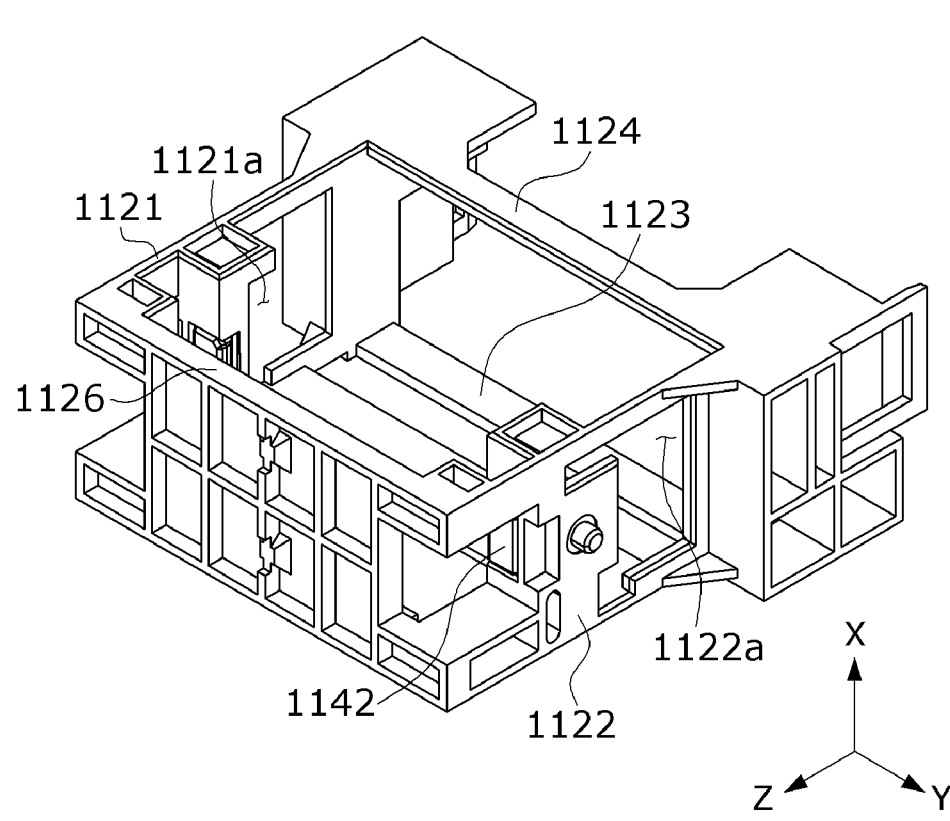
FIG. 6 is a perspective view illustrating a housing according to the embodiment.
Figure 7:
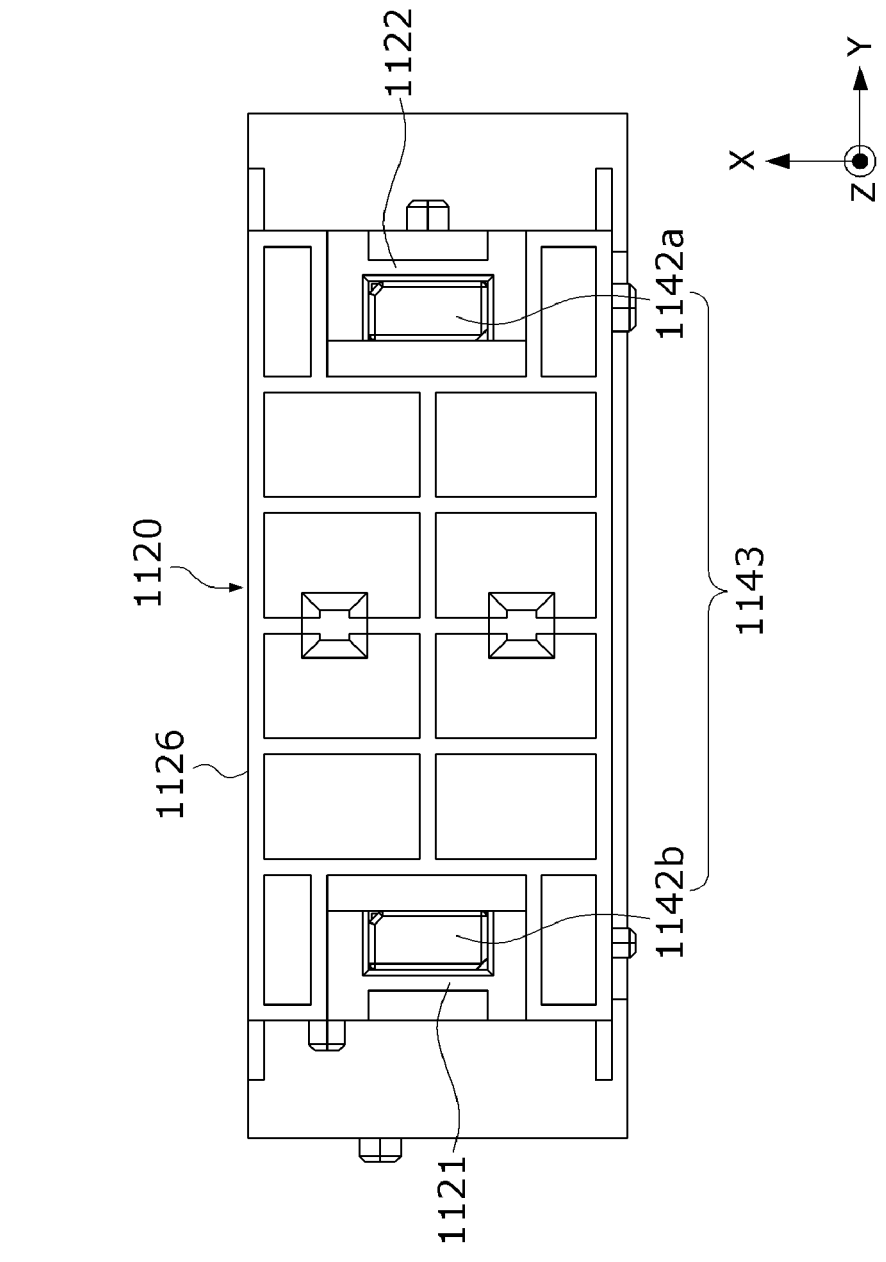
FIG. 7 is a front view illustrating the housing according to the embodiment.

FIG. 6 is a perspective view of a housing according to the embodiment, and FIG. 7 is a front view of the housing according to the embodiment.

Referring to FIGS. 6 and 7, at least one first magnet 1142 may be provided, and the at least one first magnet 1142 may be coupled to the housing 1120. According to the present embodiment, a plurality of first magnets 1142 may be provided, and the plurality of first magnets 1142 may be disposed to be spaced apart from each other on the housing 1120.

The first magnet 1142 may include a 1a magnet 1142a and a 1b magnet 1142b. In this case, the 1a magnet 1142a and the 1b magnet 1142b may be members having the same shape. The 1a magnet 1142a and the 1b magnet 1142b may be spaced apart from each other in the second direction (Y-axis direction). In this case, a space in which the holder 1131 is disposed may be provided between the separated 1a magnet 1142a and 1b magnet 1142b.

For example, the 1a magnet 1142a may be disposed on the first housing side portion 1121. In this case, the first housing side portion 1121 may include a groove which corresponds to a shape of the 1a magnet 1142a and in which the 1a magnet 1142a is disposed. In addition, the 1b Magnet 1142b may be disposed on the second housing side portion 1122. In this case, the first housing side portion 1121 and the second housing side portion 1122 may have symmetrical shapes in the second direction (Y-axis direction).

The grooves formed in the first housing side portion 1121 and the second housing side portion 1122 may be open in the first direction (Z-axis direction). In this case, the grooves may not overlap the fifth housing side portion 1126 in the first direction (Z-axis direction). In other words, when the housing 1120 is viewed from the first direction (Z-axis direction), one surface of the first magnet 1142 disposed in the groove may be exposed.

Meanwhile, holes 1121a and 1122a may be formed in the first housing side portion 1121 and the second housing side portion 1122, respectively. The holes 1121a and 1122a may be spaced apart from each other in the second direction (Y-axis direction). In this case, the driving part 1150 may be disposed in the holes 1121a and 1122a. For example, the first driving part 1150a may be disposed in the hole 1121a of the first housing side portion 1121, and the second driving part 1150b may be disposed in the hole 1122a formed in the second housing side portion 1122.

Figure 8:
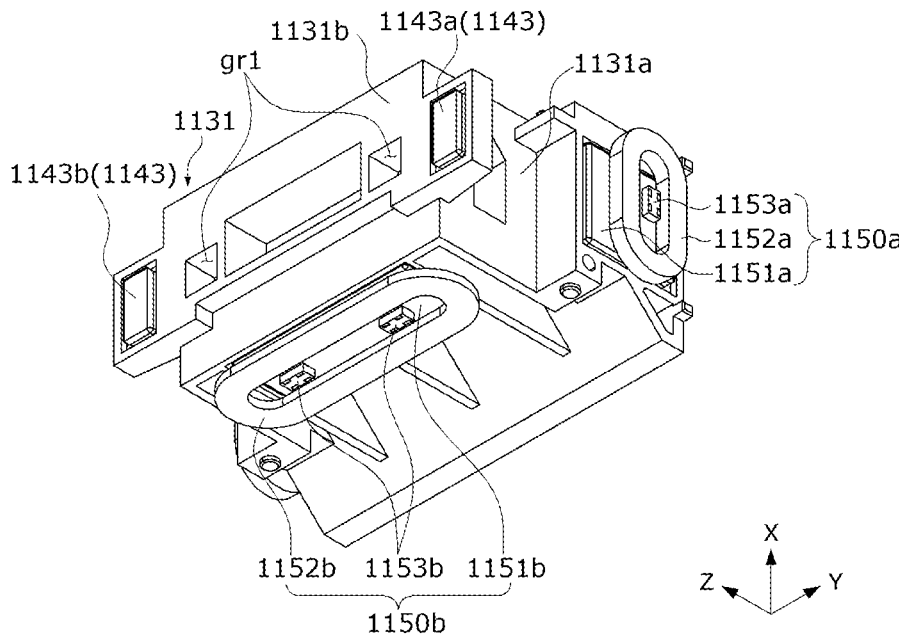
FIGS. 8 and 9 are perspective views of a holder and a driving part according to the embodiment.
Figure 9:
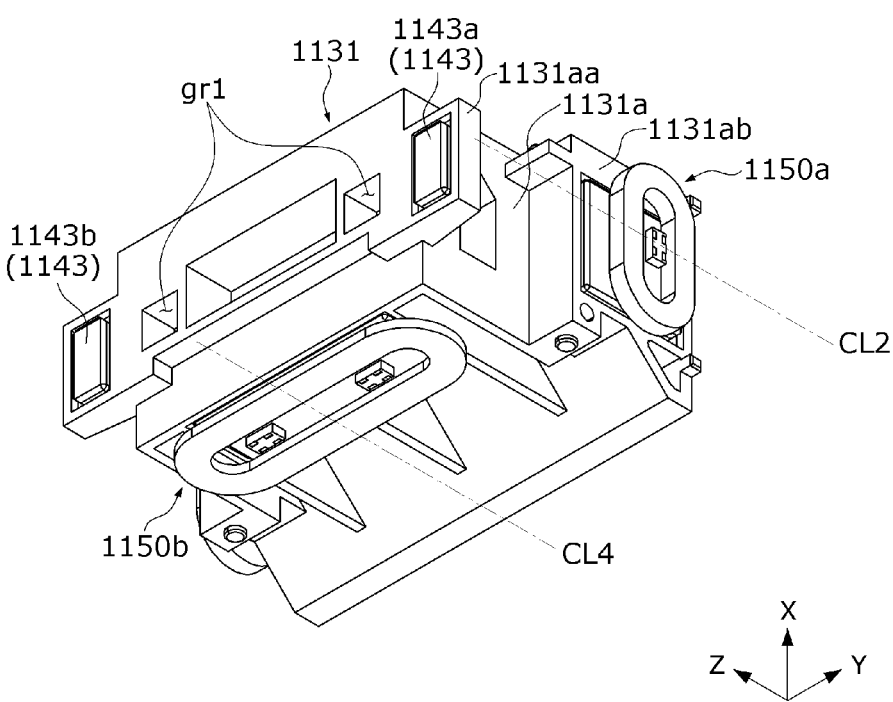

FIGS. 8 and 9 are perspective views of a holder and a driving part according to the embodiment.

Referring to FIGS. 8 and 9, the driving part 1150 may include the first driving part 1150a and the second driving part 1150b. The first driving part 1150a and the second driving part 1150b may be disposed on different outer surfaces of the holder 1131. The first driving part 1150a and the second driving part 1150b may be disposed in different directions with respect to the holder 1131. For example, the first driving part 1150a may be disposed in the second direction (Y-axis direction) with respect to the holder 1131. In addition, the second driving part 1150b may be disposed in the first direction (Z-axis direction) with respect to the holder 1131. The first driving part 1150a and the second driving part 1150b disposed as described above can secure a separation space to avoid magnetic field interference between the drive magnets.

The first driving part 1150a may include a first drive magnet 1151a, a first drive coil 1152a, and a first Hall sensor 1153a.

The first drive magnet 1151a may provide a driving force generated by an electromagnetic force. The first drive magnet 1151a may be disposed on the second holder outer surface 1131a. In this case, a groove corresponding to a shape of the first drive magnet 1151a may be formed in the second holder outer surface 1131a. The first drive magnet 1151a may be disposed in the groove.

The first drive magnet 1151a may be spaced apart from a 2a magnet 1143a in the first direction (Z-axis direction). In addition, the first drive magnet 1151a and the 2a magnet 1143a may overlap each other in the first direction (Z-axis direction). In this case, the second housing side portion 1122 (see FIG. 6) may be disposed in a separation space between the first drive magnet 1151a and the 2a magnet 1143a.

The first drive coil 1152a may include a plurality of coils. In an embodiment, the first drive coil 1152a may include at least one coil, and the at least one coil may be positioned to correspond to the first drive magnet 1151a. The first drive coil 1152a may be disposed in the second direction (Y-axis direction) with respect to the outer surface of the holder 1131.

The first drive coil 1152a may be coupled to a board side portion to be described below. In addition, the board side portion may be coupled to and electrically connected to the first Hall sensor 1153a.

The second driving part 1150b may include a second drive magnet 1151b, a second drive coil 1152b, and a second Hall sensor 1153b.

The second drive magnet 1151b may provide a driving force generated by an electromagnetic force like the first drive magnet 1151a. The second drive magnet 1151b may be disposed on the third holder outer surface. The third holder outer surface may be perpendicular to the second holder outer surface 1131a. A groove corresponding to a shape of the second drive magnet 1151b may be formed in the third holder outer surface. The second drive magnet 1151b may be disposed in the groove. In this case, the second drive magnet 1151b may not overlap any one of the second magnet 1143 in the first to third directions (Z-axis, Y-axis, and X axis directions).

The second drive coil 1152b may include a plurality of coils. In an embodiment, the second drive coil 1152b may include at least one coil, and the at least one coil may be positioned to correspond to the second drive magnet 1151b. The second drive coil 1152b may be disposed in the third direction (X-axis direction) with respect to the outer surface of the holder 1131.

The second drive coil 1152b may be coupled to the board side portion to be described below. In addition, the board side portion may be coupled to and electrically connected to the second Hall sensor 1153b.

The first camera actuator according to the embodiment may control the mover 1130 to rotate along the second axis (in the Y-axis direction) or the third axis (in the X-axis direction) by the electromagnetic forces generated between the first drive magnet 1151a and the second drive magnet 1151b and the first drive coil 1152a and the second drive coil 1152b, thereby minimizing the occurrence of a decentering or tilting phenomenon and providing the best optical characteristics upon implementing an OIS.

As described above, the camera actuator according to the present invention can secure a separation distance between the first driving part 1150a, the second driving part 1150b, and the second magnet 1143 and implement a structure in which the first driving part 1150a and the second driving part 1150b are disposed vertically with respect to the holder 1131, thereby minimizing magnetic interference between the drive magnets and the second magnet 1143. In particular, it is possible to improve the arrangement relationship between the second drive magnet 1151b and the second magnet 1143, thereby preventing the conventional phenomenon in which the second drive magnet malfunctions due to the interference with the second magnet.

By arranging the first driving part 1150a and the second driving part 1150b to be spaced apart from the second magnet 1143 in different directions, it is possible to sufficiently secure the separation distances from the second magnet 1143, thereby preventing the magnetic field interference occurring between the magnets.

Figure 10:
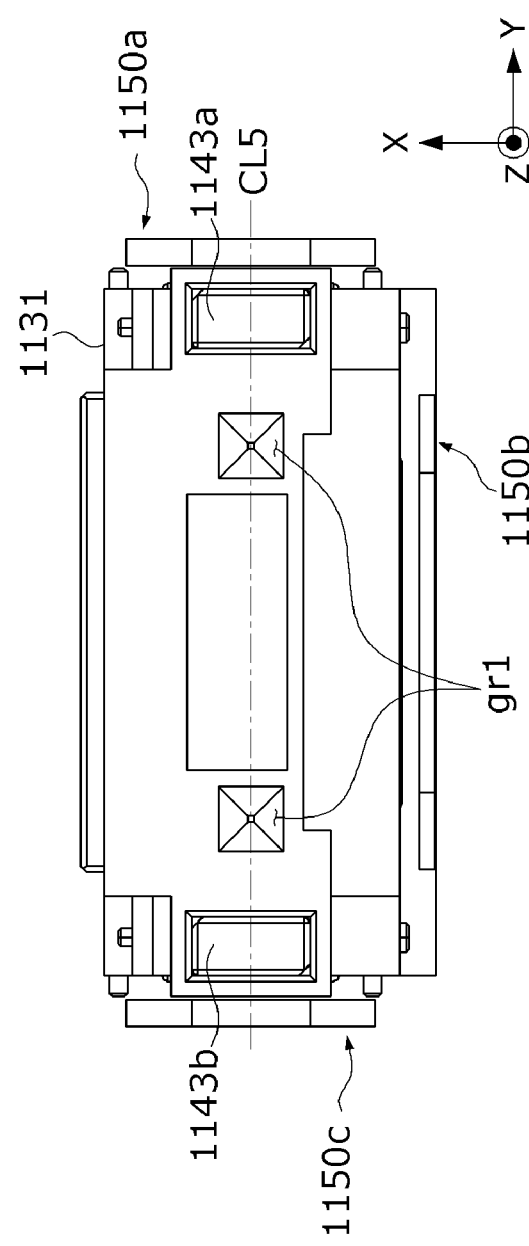
FIG. 10 is a front view of the holder and the driving part according to the embodiment.
Figure 11:
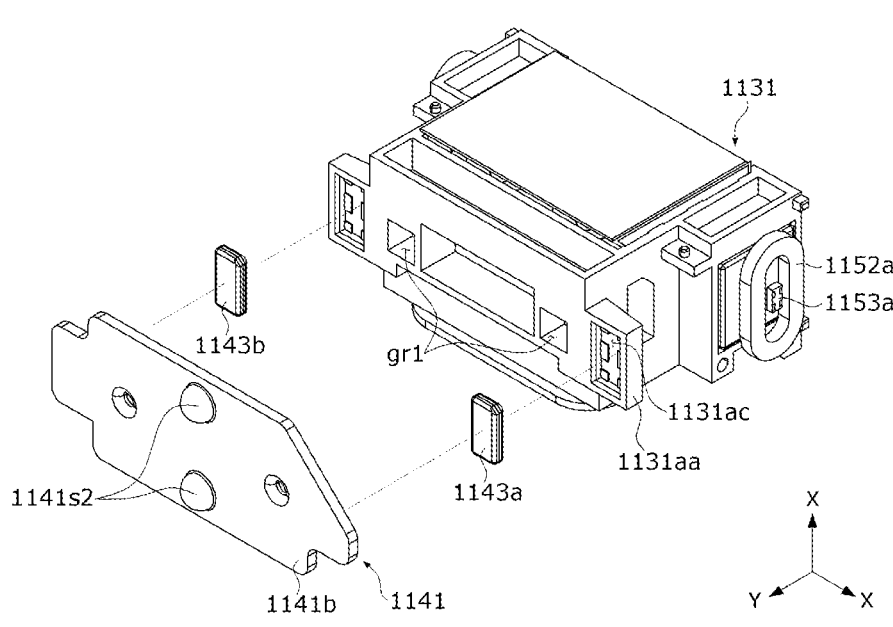
FIG. 11 is an exploded perspective view of the holder and a tilting guide part according to the embodiment.
Figure 12:
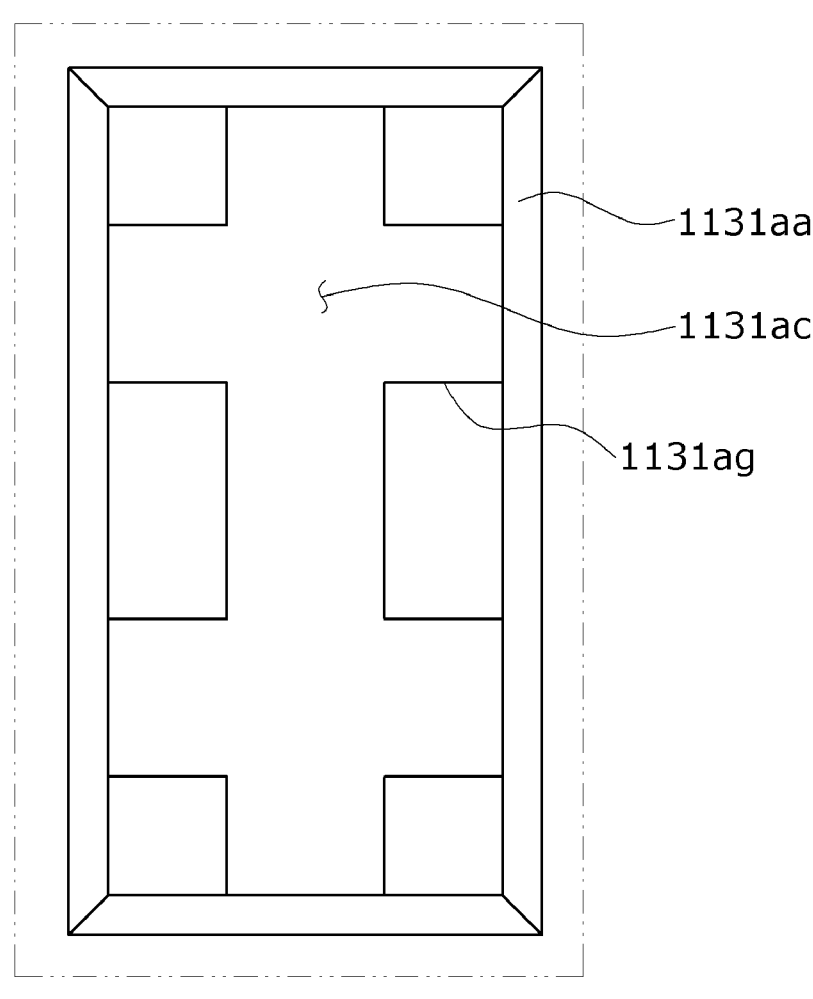
FIG. 12 is a view illustrating a first seating part of the holder according to the embodiment.

FIG. 10 is a front view of the holder and the driving part according to the embodiment, FIG. 11 is an exploded perspective view of the holder and a tilting guide part according to the embodiment, and FIG. 12 is a view illustrating a first seating part of the holder according to the embodiment.

Referring to FIGS. 10 and 11, the driving part may further include a third driving part 1150c for driving the mover together with the first driving part 1150a and the second driving part 1150b.

The third driving part 1150c may be disposed on the first holder outer surface and spaced apart from the first driving part 1150a and the second driving part 1150b. In other words, the third driving part 1150b may be disposed in the second direction (Y-axis direction) with respect to the holder 1131. In addition, the third driving part 1150c may be disposed at the opposite side of the first driving part 1150a with respect to the holder 1131. The third driving part 1150b may have a shape symmetrical to the first driving part 1150a in the second direction (Y-axis direction) and may be operated by the same principle as the first driving part 1150a.

The holder 1131 may include a fourth holder outer surface 1131b at the front thereof.

The fourth holder outer surface 1131b may be perpendicular to a surface on which the driving part 1150 is disposed. The fourth holder outer surface 1131b may be disposed toward the tilting guide part 1141 (see FIG. 5). In addition, a protrusion groove gr1 may be formed in the fourth holder outer surface 1131b. For example, a plurality of protrusion grooves gr1 may be provided, and the plurality of protrusion grooves gr1 may be spaced apart in the second direction (Y-axis direction). In this case, one of the plurality of protrusion grooves gr1 may be disposed adjacent to the 2a magnet 1143a, and the other one may be disposed adjacent to the 2b magnet 1143b. In this case, assuming that a virtual straight line extending to pass through a center of a width of the plurality of protrusion grooves gr1 is a fifth virtual line CL5, the 2a magnet 1143a and the 2b magnet 1143b may be bisected with respect to the fifth virtual line CL5. In other words, the fifth virtual line CL5 may pass through centers of widths of the 2a magnet 1143a and the 2b magnet 1143b in the third direction (X-axis direction).

A protruding portion of the tilting guide part 1141 may be disposed in the protrusion groove gr1. The tilting guide part 1141 may be disposed in the first direction (Z-axis direction) with respect to the holder 1131. The tilting guide part 1141 may be formed in a plate shape to have one surface facing the holder 1131 and the other surface facing the housing. In addition, a first protruding portion 1141s1 protruding toward the holder 1131 may be formed on one surface of the tilting guide part 1141, and a plurality of second protruding portions 1141s2 protruding toward the housing may be formed on the other surface.

The tilting guide part 1141 may overlap any one of the 2a magnet 1143a and the 2b magnet 1143b in the first direction (Z-axis direction). In addition, the tilting guide part 1141 may overlap any one of the first driving part 1150a and the third driving part 1150c in the first direction (Z-axis direction). In this case, the holder 1131 may include a first member 1131aa disposed on the second holder outer surface 1131a. The first member 1131aa may be disposed adjacent to the tilting guide part 1411 so that the second magnet 1142a may be coupled thereto. In addition, the holder 1131 may include a second member 1131ab disposed on the second holder outer surface 1131a. The second member 1131ab may be spaced apart from the tilting guide part 1411 in the first direction (Z-axis direction) with the first member 1131aa interposed therebetween. In this case, a separation space is formed between the first member 1131aa and the second member 1131ab, and the second housing side portion may be disposed in the separation space.

The first member 1131aa may include a first accommodating portion 1131ac. The first accommodating portion 1131ac is to arrange the second magnet 1142 and may be formed to correspond to a shape of the second magnet 1142a. In addition, the first member 1131aa may include a groove portion 1131ag disposed inside the first accommodating portion 1131ac. The first member 1131aa may be disposed on a surface facing the second magnet 1142. The groove portion 1131_ag_ is a space filled with a bonding member to be bonded with the second magnet 1142_a_. In this case, the groove portion 1131_ag_ may have a cross-shaped or straight-shaped shape.

Figure 13:
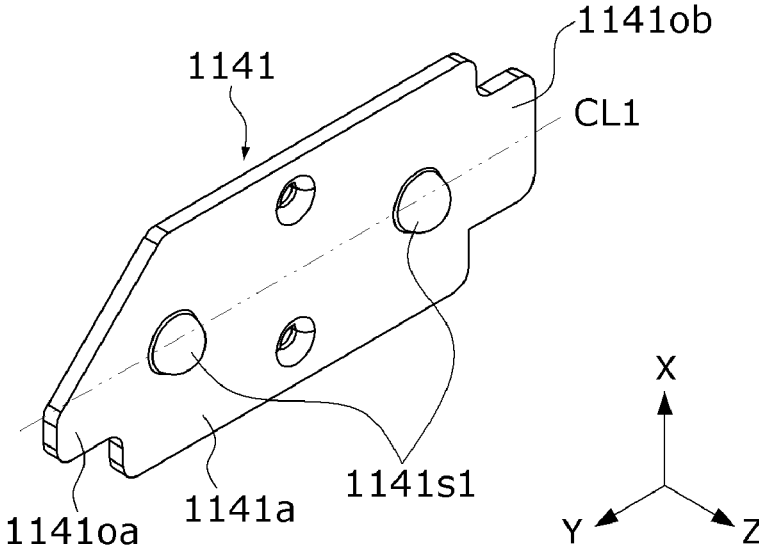
FIGS. 13 and 14 are perspective views of the tilting guide part according to the embodiment.
Figure 14:
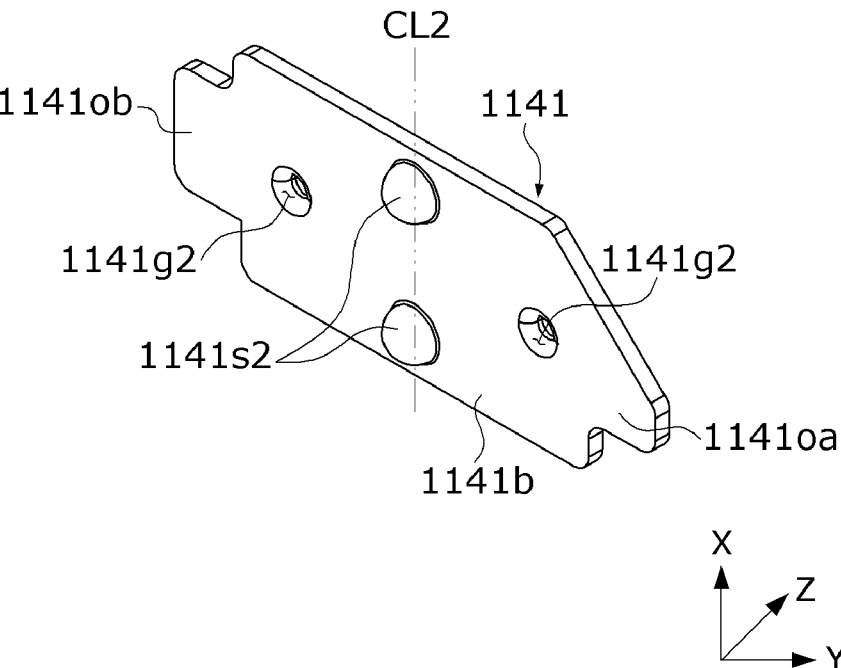
Figure 15:
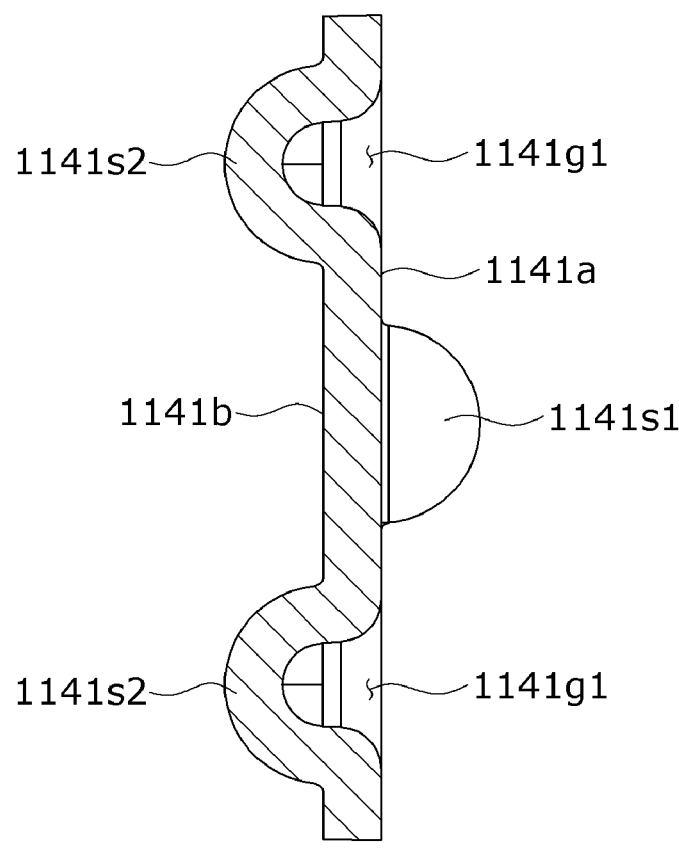
FIG. 15 is a cross-sectional view of the tilting guide part according to the embodiment.

FIGS. 13 and 14 are perspective views of the tilting guide part according to the embodiment, and FIG. 15 is a cross-sectional view of the tilting guide part according to the embodiment.

Referring to FIGS. 13 to 15, the tilting guide part 1411 may include a first protruding portion 1141_s_1 and a second protruding portion 1141_s_2.

The tilting guide part 1411 may include a first surface 1141_a_ and a second surface 1141_b_. The first surface 1141_a_ may be disposed toward the holder 1131 (see FIG. 5), and the second surface 1141_b_ may be disposed toward the housing 1120 (see FIG. 5).

The first surface 1141_a_ may include the first protruding portion 1141_s_1 protruding in the first direction (Z-axis direction). For example, two first protruding portions 1141_s_1 may be provided, and the two first protruding portions 1141_s_1 may be spaced apart from each other in the second direction (Y-axis direction). Meanwhile, the second surface 1141_b_ may include the second protruding portion 1141_s_2 protruding in the first direction (Z-axis direction). For example, two second protruding portions 1141_s_2 may be provided, and the two second protruding portions 1141_s_2 may be spaced apart in the third direction (X-axis direction). In addition, the first surface 1141_a_ may include a first recessed groove 1141_g_1 formed by the protrusion of the second protruding portion 1141_s_2 of the second surface 1141_b_, and the second surface 1141_b_ may include a second recessed groove 1141_g_2 formed by the protrusion of the first protruding portion 1141_s_1.

In the tilting guide part 1141, a first virtual line CL1 passing through a center of a width of the first protruding portion 1141_s_1 and a second virtual line passing through a center of a width of the second protruding portion 1141S2 may cross perpendicularly. In this case, the first virtual line CL1 may pass through the center of the width of the two first protruding portions 1141_s_1 in the second direction (Y-axis direction). In addition, the second virtual line CL2 may pass through the center of the width of the second protruding portion 1141_s_2 in the third direction (X-axis direction). For example, an intersection of the first virtual line CL1 and the second virtual line CL2 may be a point corresponding to the center of gravity of the tilting guide part 1141.

Figure 16:
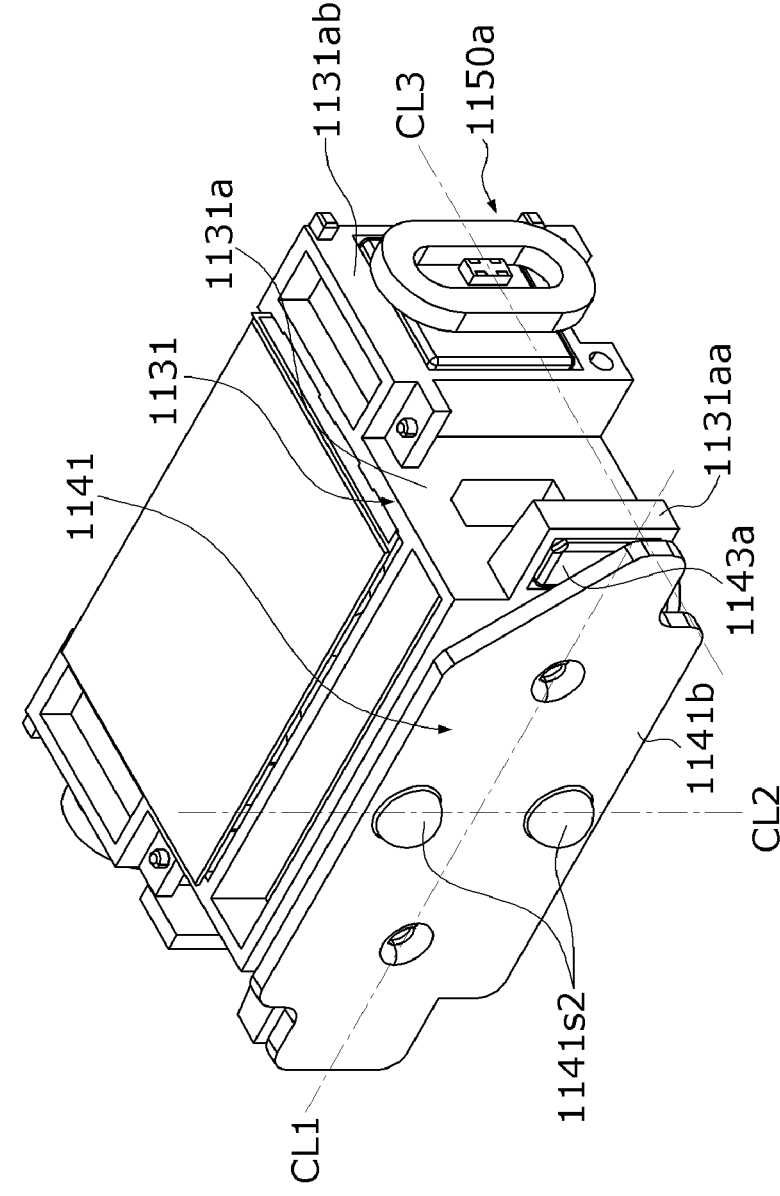
FIG. 16 is a perspective view of the holder and the tilting guide part according to the embodiment.
Figure 17:
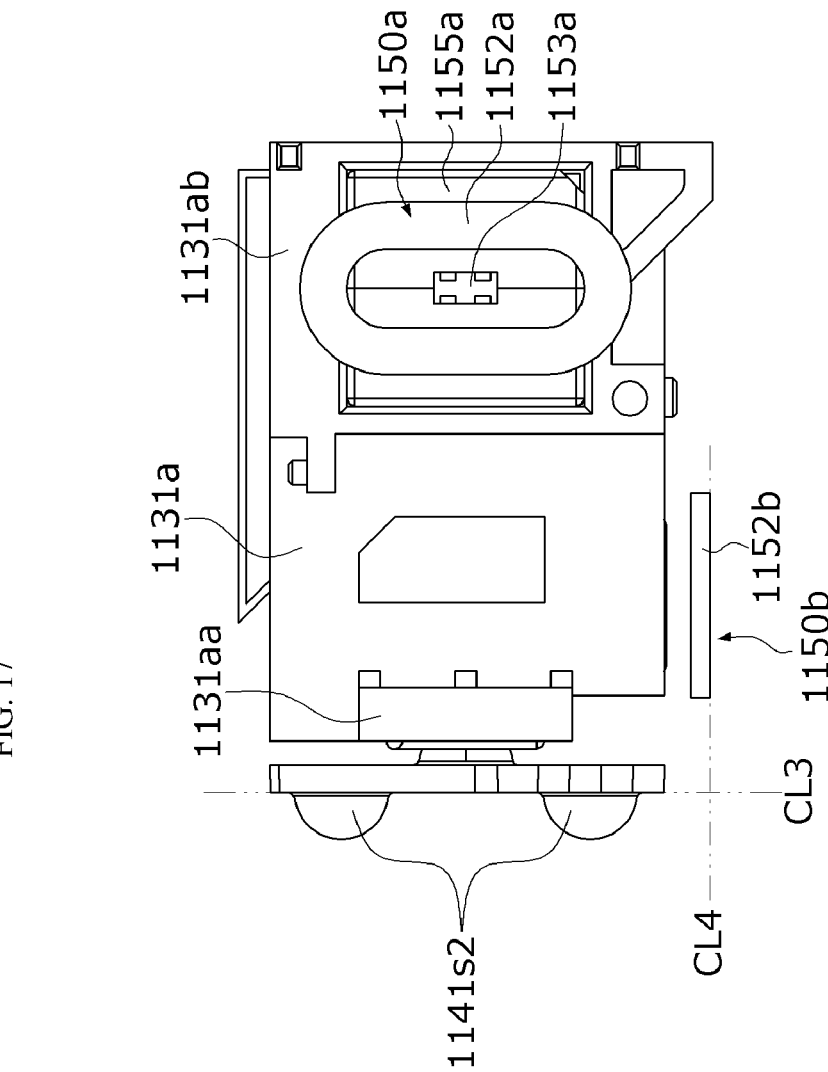
FIG. 17 is a side view of the holder and the tilting guide part according to the embodiment.
Figure 18:
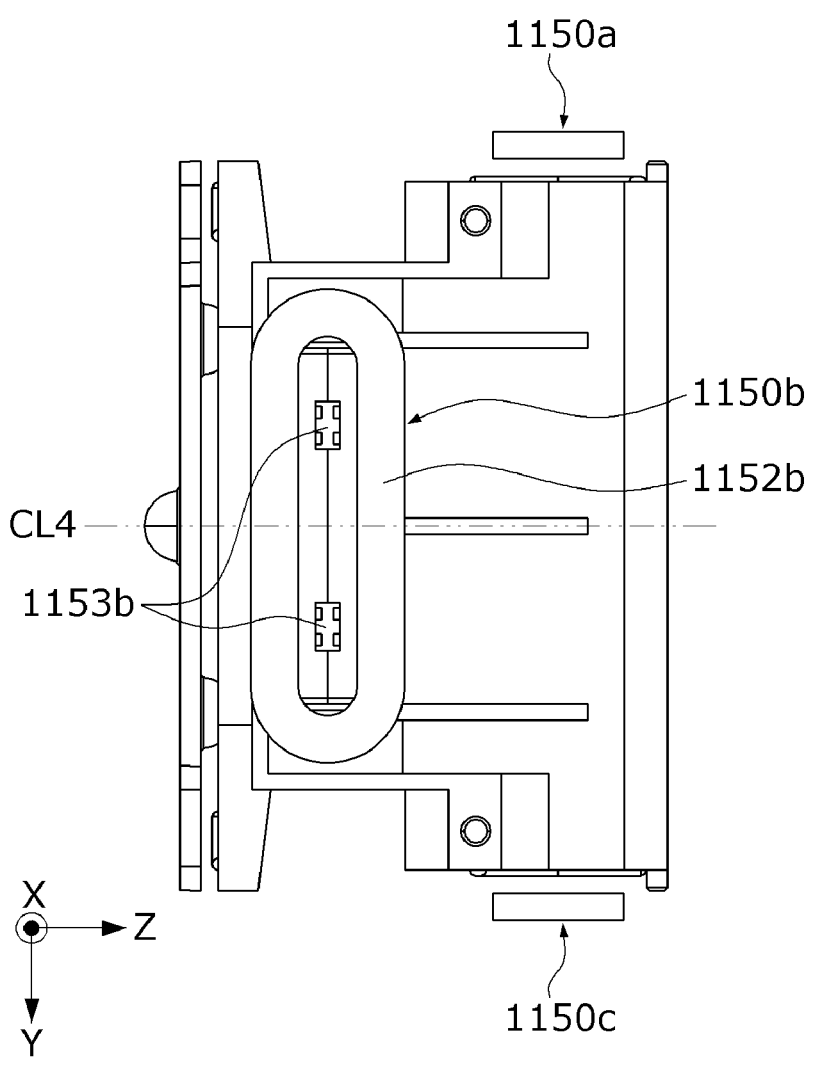
FIG. 18 is a bottom view of the holder and the tilting guide part according to the embodiment.

FIG. 16 is a perspective view of the holder and the tilting guide part according to the embodiment, FIG. 17 is a side view of the holder and the tilting guide part according to the embodiment, and FIG. 18 is a bottom view of the holder and the tilting guide part according to the embodiment.

Referring to FIGS. 16 to 18, the first driving part 1150_a_ may be disposed in the first direction (Z-axis direction) with respect to the tilting guide part 1141. In addition, the first driving part 1150_a_ may be spaced apart from the tilting guide part 1141 with the 2a magnet 1143_a_ interposed therebetween. In this case, the first drive magnet 1151_a_ may be disposed on the second holder outer surface 1131_a_ and may overlap one side portion of the tilting guide part 1141 in the first direction (Z-axis direction).

Meanwhile, the first drive coil 1152_a_ may be spaced apart from the second holder outer surface 1131_a_ and may not overlap the tilting guide part 1141 in the first direction (Z-axis direction). In this case, the first drive coil 1152_a_ may have a width in the third direction (X-axis direction) that is larger than a width in the first direction (Z-axis direction). In addition, the first Hall sensor 1153_a_ may be disposed inside the first drive coil 1152_a_.

In addition, the second driving part 1150_b_ may be disposed adjacent to the tilting guide part 1141. In this case, the second driving part 1150_b_ may be disposed closer to the tilting guide part 1141 than the first driving part 1150_a_ is. The second drive magnet 1151_b_ may be disposed on the third holder outer surface and may overlap the other side portion of the tilting guide part 1141 in the first direction (Z-axis direction).

Meanwhile, the second drive coil 1152_b_ may be spaced apart from the third holder outer surface and may not overlap the tilting guide part 1141 in the first direction (Z-axis direction). In this case, the second drive coil 1152_b_ may have a width in the second direction (Y-axis direction) that is larger than a width in the first direction (Z-axis direction). In addition, the second Hall sensor 1153_b_ may be disposed inside the second drive coil 1152_b_. A plurality of second Hall sensors 1153_b_ may be provided, and the plurality of second Hall sensors 1153_b_ may be spaced apart from each other in the second direction (Y-axis direction).

Assuming that a virtual straight line extending in the first direction (Z-axis direction) to pass through a center of a width of the first drive coil 1152_a_ is referred to as a third virtual line CL3, the third virtual line CL3 may cross the first virtual line CL1 (see FIG. 13). In this case, the first virtual line CL1 and the third virtual line CL3 may be perpendicular. In addition, assuming that a virtual straight line extending in the first direction (Z-axis direction) to pass through a center of a width of the second drive coil 1152_b_ is referred to as a fourth virtual line CLA, the fourth virtual line CL4 may cross the second virtual line CL2 (see FIG. 14). In this case, the fourth virtual line CL4 and the second virtual line CL2 may be perpendicular.

Figure 19:
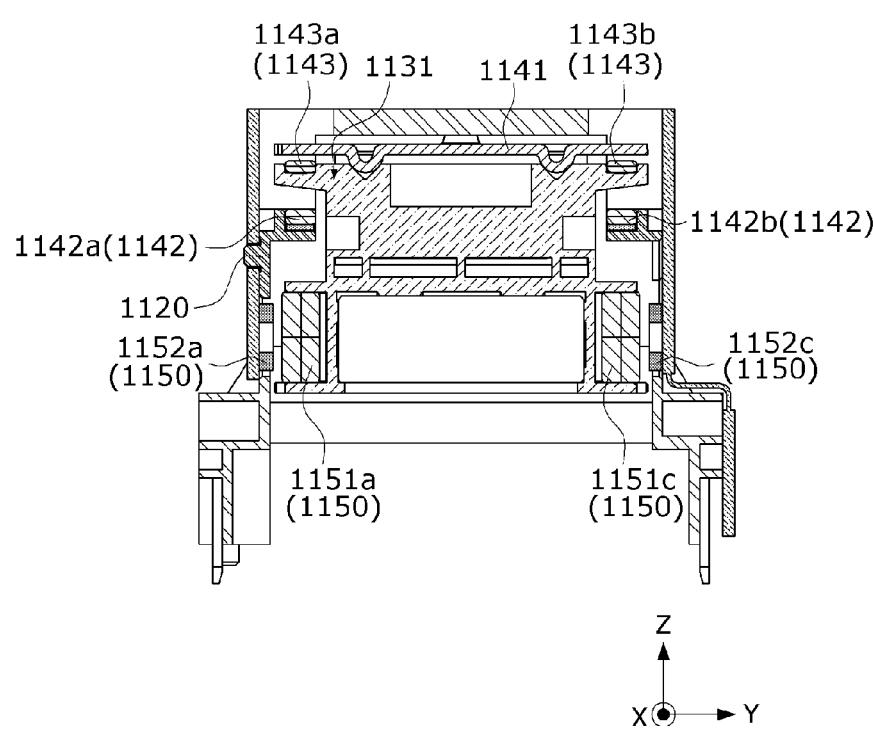
FIG. 19 is a cross-sectional view of the first camera actuator according to the embodiment.

FIG. 19 is a cross-sectional view of the first camera actuator according to the embodiment.

Referring to FIG. 19, the housing 1120 may be disposed inside the board part 1154. In this case, the board part 1154 may surround at least one surface of the housing 1120. In addition, the holder 1131 may be disposed inside the housing 1120. In this case, the housing 1120 may surround at least one surface of the holder 1131. In this case, the first magnet 1142 coupled to the housing 1120 may be disposed between the second magnet 1143 disposed in the holder 1131 and the drive magnets 1151_a_ and 1151_c_. In addition, the tilting guide part 1141 may be disposed between the housing 1120 and the holder 1131.

The driving part 1150 may be disposed on at least one surface of the holder 1131. For example, the driving part 1150 may be disposed on three outer surfaces of the holder 1131. In addition, the outer surfaces on which the driving part 1150 is disposed may be disposed perpendicular to each other.

The driving part 1150 may include a plurality of drive coils 1152_a_ and 1152_b_. The plurality of drive coils 1152_a_ and 1152_b_ may be spaced apart from the outer surface of the holder 1131. The plurality of drive coils 1152_a_ and 1152_b_ may not overlap any one magnet 1143_a_ of the second magnet in the first to third directions (Z-axis, Y-axis, and X-axis directions). In addition, the plurality of drive coils 1152_a_ and 1152_b_ may pass through holes formed in the housing 1120 and come into contact with the board part 1154. In this case, the plurality of drive coils 1152_a_ and 1152_b_ may be electrically connected to the board part 154. In addition, the plurality of drive coils 1152_a_ and 1152_b_ may receive a current from the board part 1154. The current is an element of an electromagnetic force that allows the camera actuator to tilt.

Figure 20:
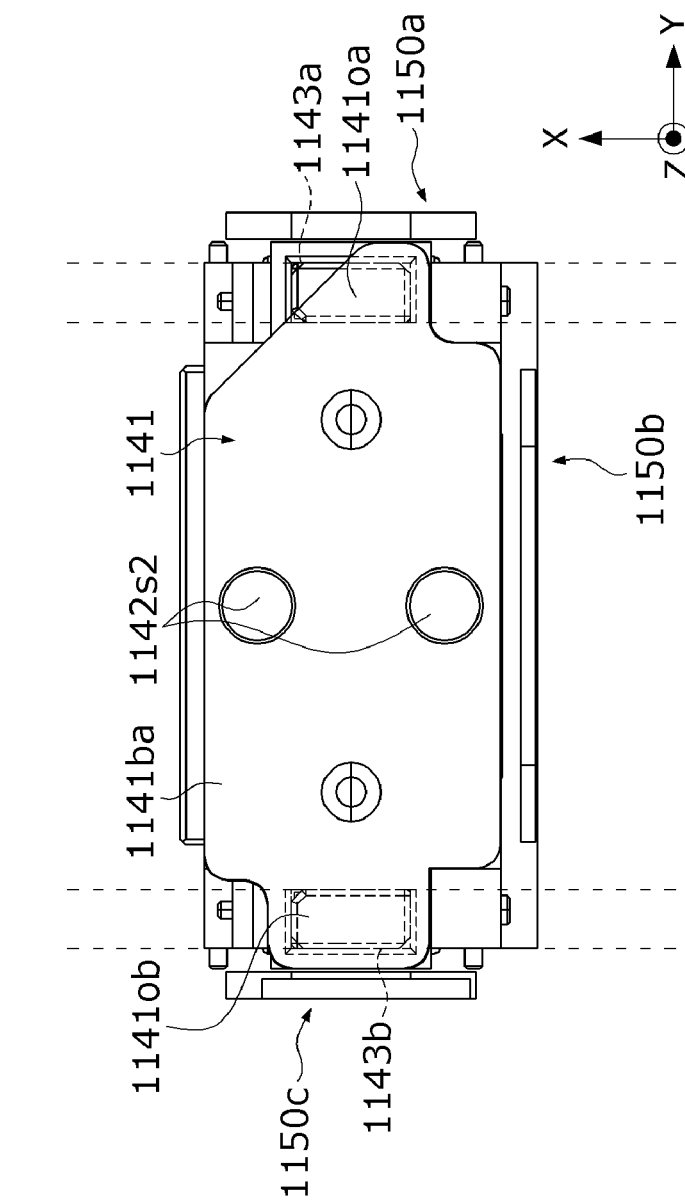
FIG. 20 is a front view of the camera holder and the tilting guide part according to the embodiment.

FIG. 20 is a front view of the holder and the tilting guide part according to the embodiment.

Referring to FIG. 20, at least portions of the 2a magnet 1143*a* and the 2b magnet 1143*b* may overlap an edge of the tilting guide part 1141. For example, the tilting guide part 1141 may have a length in the second direction (Y-axis direction) that is larger than a length in the third direction (X-axis direction). In addition, the tilting guide part 1141 may have the length in the second direction (Y-axis direction) that is larger than a distance between the 2a magnet 1143*a* and the 2b magnet 1143*b*. Therefore, the tilting guide part 1141 may include an area in which the 2a magnet 1143*a* and the 2b magnet 1143*b* overlap each other at the edge thereof.

Specifically, the tilting guide part 1141 may include a base area 1141*ba*, a first overlap area 1141*oa*, and a second overlap area 1141*ob*.

The base area 1141*ba* may include a central portion of the tilting guide part 1141. A point at which the first virtual line CL1 (see FIG. 13) and the second virtual line CL2 (see FIG. 14) cross may be disposed on the base area 1141*ba*. The base area 1141*ba* may be coupled to the holder 1131 and the housing 1120. The first protruding portion may be disposed on one surface of the base area 1141*ba* to be coupled to the holder 1131, and the second protruding portion 1142*s*2 may be disposed on the other surface to be coupled to the housing 1120.

The first overlap area 1141*oa* and the second overlap area 1141*ob* may extend from both sides of the base area 1141*ba*. The first overlap area 1141*oa* and the second overlap area 1141*ob* may have a smaller width in the third direction (X-axis direction) than the base area 1141*ba*. In addition, the first overlap area 1141*oa* and the second overlap area 1141*ob* may be formed asymmetrically with respect to a center point of the tilting guide part 1141.

The first overlap area 1141*oa* may overlap at least a portion of the 2a magnet in the first direction (Z-axis direction). In addition, the second overlap area 1141*ob* may overlap at least a portion of the 2b magnet 1143*b* in the first direction (Z-axis direction). This tilting guide part 1141 may include the first overlap area 1141*oa* and the second overlap area 1141*ob* to prevent the 2a magnet 1143*a* and the 2b magnet 1143*b* from being separated from the holder 1131 or contaminated from external substances.

Figure 21:
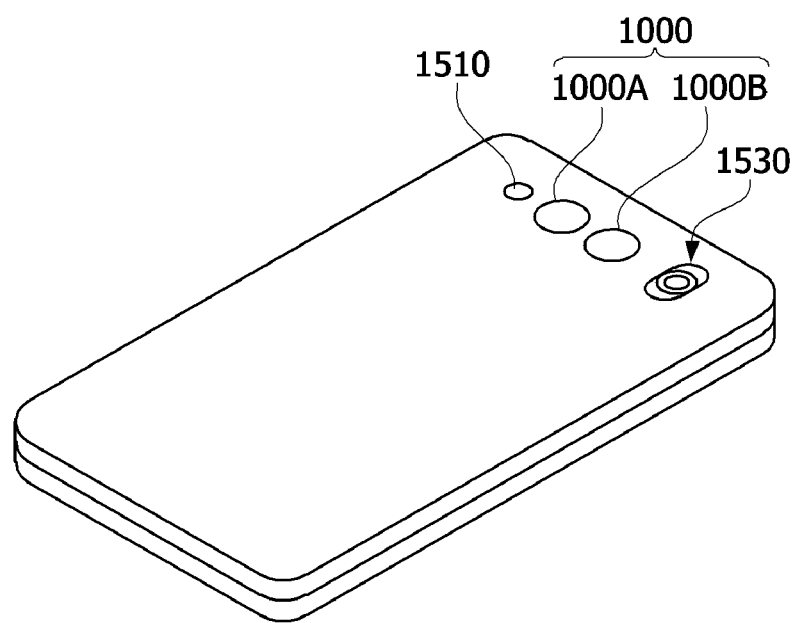
FIG. 21 is a perspective view of a mobile terminal to which the camera module according to the embodiment is applied.

FIG. 21 is a perspective view of a mobile terminal to which the camera module according to the embodiment is applied.

Referring to FIG. 21, a mobile terminal 1500 according to the embodiment may include the camera module 1000, a flash module 1530, and an AF device 1510, which are provided on a rear surface thereof.

The camera module 1000 may include an image capturing function and an AF function. For example, the camera module 1000 may include the AF function using an image.

The camera module 1000 processes an image frame of a still image or a moving image obtained by an image sensor in a capturing mode or a video call mode.

The processed image frame may be displayed on a predetermined display and stored in a memory. A camera (not illustrated) may also be disposed on a front surface of a body of the mobile terminal.

For example, the camera module 1000 may include a first camera module 1000A and a second camera module 1000B, and the first camera module 1000A may implement an OIS function together with an AF or zooming function.

The flash module 1530 may include a light emitting device for emitting light therein. The flash module 1530 may be operated by a camera operation of the mobile terminal or a user's control.

The AF device 1510 may include one of a package of a surface light emitting laser device as a light emitting unit.

The AF device 1510 may include the AF function using a laser. The AF device 1510 may be mainly used in a condition that the AF function using the image of the camera module 1000 is degraded, for example, a proximity of 10 m or less or dark environment.

The AF device 1510 may include a light emitting unit including a vertical cavity surface emitting laser (VCSEL) semiconductor device and a light receiving unit for converting light energy into electrical energy, such as a photodiode.

Figure 22:
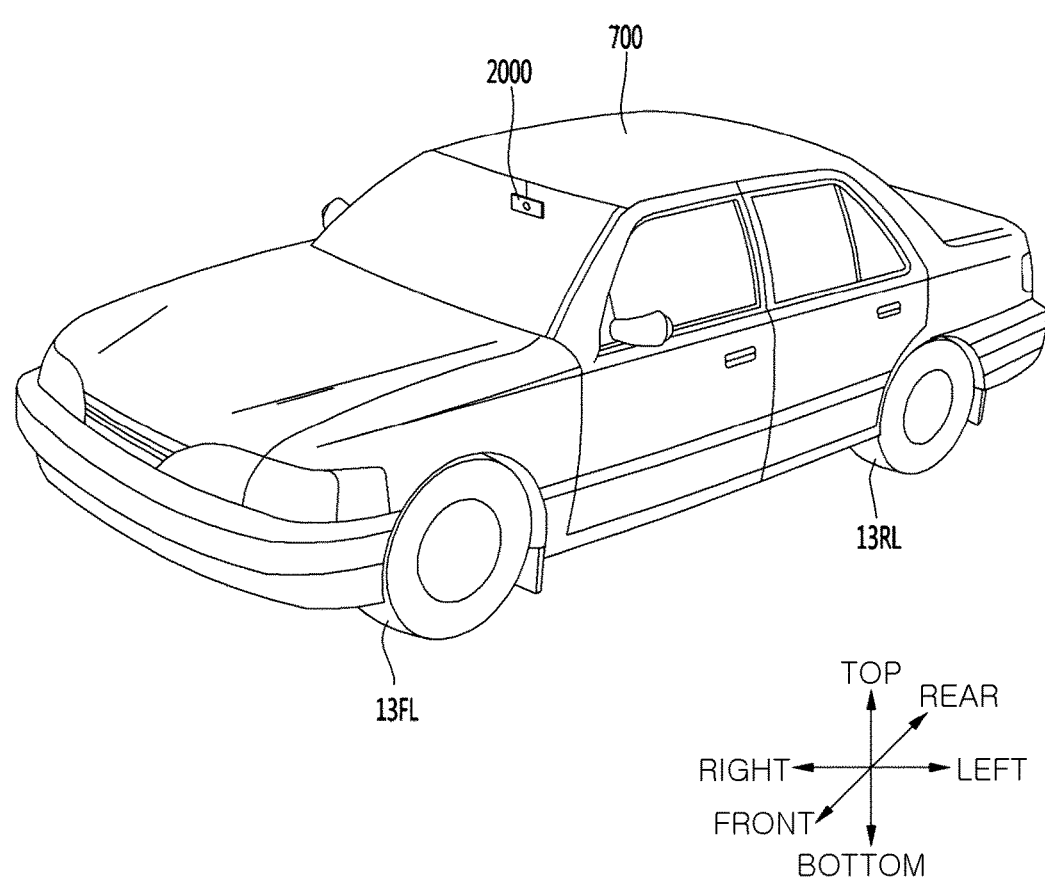
FIG. 22 is a perspective view of a vehicle to which the camera module according to the embodiment is applied.

FIG. 22 is a perspective view of a vehicle to which the camera module according to the embodiment is applied.

For example, FIG. 22 is an external view illustrating the vehicle including a vehicle driving assistance device to which the camera module 1000 according to the embodiment is applied.

Referring to FIG. 22, a vehicle 700 according to the embodiment may include wheels 13FL and 13FR rotated by a power source and a predetermined sensor. Although the sensor may be a camera sensor 2000, the present invention is not limited thereto.

The camera sensor 2000 may be a camera sensor to which the camera module 1000 according to the embodiment is applied. The vehicle 700 according to the embodiment may acquire image information through the camera sensor 2000 for capturing a forward image or a surrounding image, determine a situation in which a lane line is not identified using the image information, and generate a virtual lane line when the lane line is not identified.

For example, the camera sensor 2000 may acquire a forward image by capturing a view in front of the vehicle 700, and a processor (not illustrated) may acquire image information by analyzing an object included in the front image.

For example, when a lane line, an adjacent vehicle, a traveling obstacle, and objects, such as a median, a curb, or a tree corresponding to an indirect road mark, are captured in the image captured by the camera sensor 2000, the processor may detect the object and include the detected object in the image information. In this case, the processor may further supplement the image information by acquiring information on a distance from the object detected through the camera sensor 2000.

The image information may be information on the object captured in the image. The camera sensor 2000 may include an image sensor and an image processing module.

The camera sensor 2000 may process still images or moving images obtained by the image sensor (e.g., a complementary metal-oxide semiconductor (CMOS) or a charge-coupled device (CCD)).

The image processing module may process the still images or moving images acquired through the image sensor to extract necessary information, and transmit the extracted information to the processor.

In this case, the camera sensor 2000 may include a stereo camera in order to improve the measurement accuracy of the object and further secure information such as a distance between the vehicle 700 and the object, but the present invention is not limited thereto.

Although embodiments have been mainly described above, these are only illustrative and do not limit the present invention, and those skilled in the art to which the present invention pertains can know that various modifications and applications not exemplified above are possible without departing from the essential characteristics of the embodiments. For example, each component specifically illustrated in the embodiments may be implemented by modification. In addition, differences related to these modifications and applications should be construed as being included in the scope of the present invention defined in the appended claims.

The invention claimed is:

1. A camera actuator, comprising:
a housing;
a mover disposed in the housing and including an optical member and a holder in which the optical member is disposed;
a tilting guide part configured to guide tilting of the mover;
a first magnet disposed in the housing;
a second magnet disposed in the holder and spaced apart from the first magnet in a first direction;
a first driving part and a second driving part configured to drive the mover, wherein the first driving part and the second magnet are disposed in a second direction perpendicular to the first direction with respect to the holder, wherein the second driving part is disposed in a third direction perpendicular to the second direction with respect to the holder, wherein at least a portion of the first magnet and the second magnet overlap with the first driving part in the first direction; and
a third driving part disposed opposite to the first driving part with respect to the holder, and wherein the second magnet includes:
a 2a magnet at least a portion of which overlaps the first driving part in the first direction; and
a 2b magnet at least a portion of which overlaps the third driving part in the first direction.

2. The camera actuator of claim 1, wherein the second magnet and the first driving part are spaced apart from each other in the first direction, and wherein the second magnet and the second driving part are spaced apart from each other in the second direction perpendicular to the first direction.

3. The camera actuator of claim 2, wherein the second magnet and the second driving part do not overlap each other in the first direction, the second direction, and a third direction perpendicular to the second direction.

4. The camera actuator of claim 2, wherein the tilting guide part is disposed in the first direction with respect to the holder.

5. The camera actuator of claim 4, wherein the tilting guide part includes an area overlapping at least a portion of the second magnet in the first direction.

6. The camera actuator of claim 2, wherein the first magnet is disposed between the second magnet and the first driving part.

7. The camera actuator of claim 1, wherein facing surfaces of the first magnet and the second magnet have the same polarity.

8. The camera actuator of claim 1, wherein the first magnet includes:
a 1a magnet disposed between the 2a magnet and the first driving part, and
a 1b magnet disposed between the 2b magnet and the third driving part.

9. The camera actuator of claim 2, wherein the tilting guide part includes a plurality of first protruding portions disposed on a surface facing the holder, and wherein the plurality of first protruding portions are spaced apart from each other in the third direction.

10. The camera actuator of claim 9, wherein the tilting guide part includes a plurality of second protruding portions disposed on a surface facing the housing, and wherein the plurality of second protruding portions are spaced apart from each other in the second direction.

11. The camera actuator of claim 9, wherein the holder includes a first groove in a surface facing the tilting guide part, and wherein the first protruding portion is disposed in the first groove.

12. The camera actuator of claim 11, wherein the surface of the holder facing the tilting guide part is perpendicular to a surface on which the first driving part and the second driving part are disposed.

13. The camera actuator of claim 10, wherein the housing includes a second groove in a surface facing the tilting guide part, and wherein the second protruding portion is disposed in the second groove.

14. The camera actuator of claim 10, wherein a first virtual line passing through centers of widths of the plurality of first protruding portions is perpendicular to a second virtual line passing through centers of widths of the plurality of second protruding portions.

15. The camera actuator of claim 14, wherein the first virtual line crosses a third virtual line extending in the first direction to pass through a center of a width of the first driving part.

16. The camera actuator of claim 15, wherein the second virtual line crosses a fourth virtual line extending in the first direction to pass through a center of a width of the second driving part.

17. The camera actuator of claim 1, wherein the holder includes a first member disposed between the driving part and the tilting guide part, and wherein the first member may include an accommodating part in which the second magnet is disposed.

18. The camera actuator of claim 17, wherein the first member includes a groove portion disposed on one surface facing the second magnet and a bonding member disposed in the groove portion to fix the second magnet.

* * * * *